US008780266B2

(12) United States Patent
Masuda

(10) Patent No.: US 8,780,266 B2
(45) Date of Patent: Jul. 15, 2014

(54) VIDEO DISPLAY DEVICE, DISPLAY CONTROL METHOD AND RECORDING MEDIUM

(75) Inventor: Kozo Masuda, Kanagawa (JP)

(73) Assignee: NEC Casio Mobile Communications, Ltd., Kanagawa (JP)

(*) Notice: Subject to any disclaimer, the term of this patent is extended or adjusted under 35 U.S.C. 154(b) by 458 days.

(21) Appl. No.: 12/873,338

(22) Filed: Sep. 1, 2010

(65) Prior Publication Data
US 2011/0050994 A1 Mar. 3, 2011

(30) Foreign Application Priority Data
Sep. 1, 2009 (JP) ................... 2009-202117

(51) Int. Cl.
H04N 7/01 (2006.01)
H04N 11/20 (2006.01)
G09G 5/00 (2006.01)

(52) U.S. Cl.
CPC ....... H04N 7/012 (2013.01); G09G 2320/0209 (2013.01); G09G 5/003 (2013.01)
USPC ............ 348/452; 348/441; 348/448; 348/446

(58) Field of Classification Search
USPC ................. 348/448–452
See application file for complete search history.

(56) References Cited

U.S. PATENT DOCUMENTS 7,268,828 B2 * 9/2007 Mutoh ............................ 348/555
2004/0125231 A1 * 7/2004 Song et al. .................... 348/452
2009/0316047 A1 * 12/2009 Sawada et al. ................ 348/569

FOREIGN PATENT DOCUMENTS

| JP | 02-196581 | 8/1990 |
| JP | 10-322664 | 12/1998 |
| JP | 11-331783 | 11/1999 |
| JP | 2003-169300 | 6/2003 |
| JP | 2004-215263 | 7/2004 |
| JP | 2005-102191 | 4/2005 |
| JP | 2009-111442 | 5/2009 |

OTHER PUBLICATIONS

JP Office Action dated May 14, 2013, with partial English translation; Application No. 2009-202117.

* cited by examiner

Primary Examiner — Jefferey Harold
Assistant Examiner — Michael Teitelbaum
(74) Attorney, Agent, or Firm — Young & Thompson

(57) ABSTRACT

Image deterioration when image data containing scanning lines of the previous and next fields mixed together by video editing is displayed is prevented. An inter-field scanning line interpolating unit superimposes scanning line data of the previous and next fields of interlacing image data in a video stream input from a tuner or a memory card to perform inter-field scanning line interpolation, and generates progressive image data corresponding to that video stream. An IP-conversion selection signal indicating a determination result whether or not the reliability of the video stream meets a predetermined level is input into a back-end from a CPU. A selector refers to the IP-conversion selection signal, and when the CPU determines that the reliability of the video stream is lower than the predetermined level, image data having undergone interpolation by the inter-field scanning line interpolating unit is selected as an image to be displayed.

14 Claims, 26 Drawing Sheets

FIG. 4A

LINE 1
LINE 2
LINE 3
LINE 4
LINE 5
LINE 6
LINE 7
LINE 8
LINE 9
LINE 10
LINE 11

FIG. 4B

LINE 1
LINE 2
LINE 3
LINE 4
LINE 5
LINE 6
LINE 7
LINE 8
LINE 9
LINE 10
LINE 11

FIG. 7

| No. | ITEM | CONTENTS |
|---|---|---|
| 1 | VIDEO FORMAT | YUV:422 |
| 2 | NUMBER OF PIXELS | 640(H)×480(V) |
| 3 | I/P | INTERLACING |
| 4 | SCANNING LINE INTERPOLATION SCHEME | 1(MOTION ADAPTING INTERPOLATING ENABLED) |

FIG. 14A

LINE 1
LINE 2
LINE 3
LINE 4
LINE 5
LINE 6
LINE 7
LINE 8
LINE 9
LINE 10
LINE 11

FIG. 14B

LINE 1
LINE 2
LINE 3
LINE 4
LINE 5
LINE 6
LINE 7
LINE 8
LINE 9
LINE 10
LINE 11

FIG. 14C

LINE 1
LINE 2
LINE 3
LINE 4
LINE 5
LINE 6
LINE 7
LINE 8
LINE 9
LINE 10
LINE 11

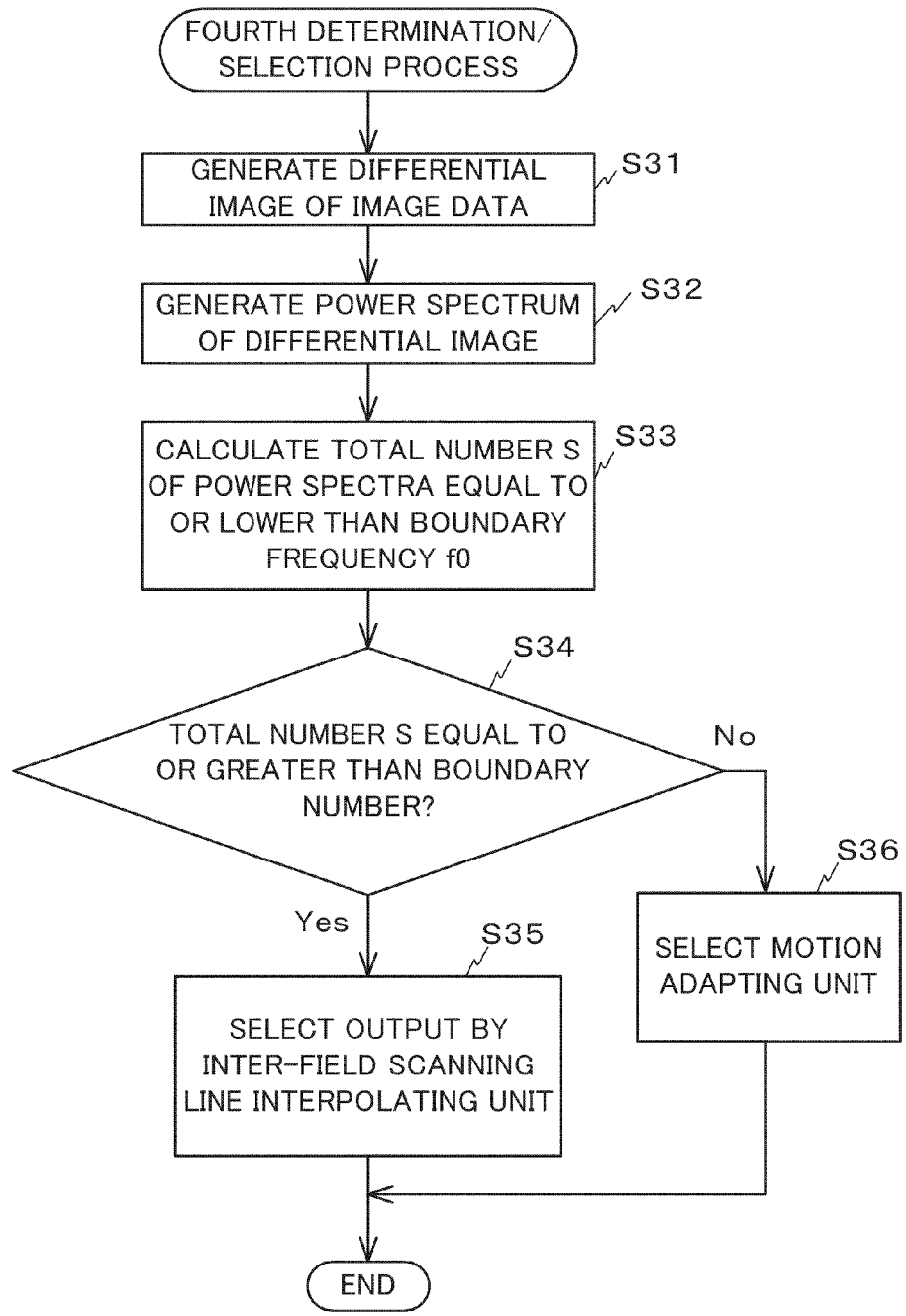

FIG. 17A

| LINE 1 | Field1—Odd1 |
| LINE 2 | |
| LINE 3 | Field1—Odd2 |
| LINE 4 | |
| LINE 5 | Field1—Odd3 |
| LINE 6 | |
| LINE 7 | Field1—Odd4 |
| LINE 8 | |
| LINE 9 | Field1—Odd5 |

FIG. 17B

| LINE 1 | |
| LINE 2 | Field2—Even1 |
| LINE 3 | |
| LINE 4 | Field2—Even2 |
| LINE 5 | |
| LINE 6 | Field2—Even3 |
| LINE 7 | |
| LINE 8 | Field2—Even4 |
| LINE 9 | |

FIG. 19A

| LINE 1 | Field1—Odd1 |
| LINE 2 | Field1—Odd1 |
| LINE 3 | Field1—Odd2 |
| LINE 4 | Field1—Odd2 |
| LINE 5 | Field1—Odd3 |
| LINE 6 | Field1—Odd3 |
| LINE 7 | Field1—Odd4 |
| LINE 8 | Field1—Odd4 |
| LINE 9 | Field1—Odd5 |

FIG. 19B

| LINE 1 | Field2—Even1 |
| LINE 2 | Field2—Even1 |
| LINE 3 | Field2—Even2 |
| LINE 4 | Field2—Even2 |
| LINE 5 | Field2—Even3 |
| LINE 6 | Field2—Even3 |
| LINE 7 | Field2—Even4 |
| LINE 8 | Field2—Even4 |
| LINE 9 | Field2—Even5 |

FIG. 24A

| | LINE 1 |
| | LINE 2 |
| | LINE 3 |
| | LINE 4 |
| | LINE 5 |
| | LINE 6 |
| | LINE 7 |
| | LINE 8 |
| | LINE 9 |
| | LINE 10 |
| | LINE 11 |

FIG. 24B

| | LINE 1 |
| | LINE 2 |
| | LINE 3 |
| | LINE 4 |
| | LINE 5 |
| | LINE 6 |
| | LINE 7 |
| | LINE 8 |
| | LINE 9 |
| | LINE 10 |
| | LINE 11 |

FIG. 24C

| | LINE 1 |
| | LINE 2 |
| | LINE 3 |
| | LINE 4 |
| | LINE 5 |
| | LINE 6 |
| | LINE 7 |
| | LINE 8 |
| | LINE 9 |
| | LINE 10 |
| | LINE 11 |

VIDEO DISPLAY DEVICE, DISPLAY CONTROL METHOD AND RECORDING MEDIUM

INCORPORATION BY REFERENCE

This application claims the benefit of Japanese Patent Application No. 2009-202117, filed on Sep. 1, 2009, the entire disclosure of which is incorporated by reference herein.

TECHNICAL FIELD

The present invention relates to a video display device which displays, for example, an image on the basis of video streams by broadcasting and an image on the basis of video streams edited by an image editing software, a display control method for that video display device, and a recording medium storing a program executed by a computer controlling that video display device.

BACKGROUND ART

Video streams like television broadcasting are generally transmitted in the form of interlace scanning (hereinafter, "interlacing") image data. In order to allow matrix-type display devices, such as liquid crystal display devices, or plasma displays, to display images by television broadcasting, pieces of image data of that video stream are converted into progressive scanning (hereinafter, "progressive") image data.

Examples of a technique of converting interlacing image data into progressive image data are an inter-field scanning line interpolation process and an in-field scanning line interpolation process. An interpolation process inserts interpolated scanning line data in a space between individual scanning lines of interlacing image data in a video stream, thereby generating progressive image data corresponding to that video stream. The inter-field scanning line interpolation process and the in-field scanning line interpolation process are both interpolation processes in common, but have a following difference.

The inter-field scanning line interpolation process uses, as interpolated scanning line data, scanning line data of previous and next fields of interlacing image data in a video stream. In contrast, the in-field scanning line interpolation process uses, as interpolated scanning line data, scanning line data in the same field (more specifically, scanning line data right above and right below) of interlacing image data in a video stream.

The inter-field scanning line interpolation process and the in-field scanning line interpolation process can be applied simultaneously. For example, a signal processing device which changes the weighting of the inter-field scanning line interpolation process and that of the in-field scanning line interpolation process depending on the motion amount (change) of an image in a video stream is used. For example, Unexamined Japanese Patent Application KOKAI Publication No. H02-196581 discloses a signal processing device which selects the in-field scanning line interpolation process if the scanning line structure of image data in a video stream does not conform to NTSC (National Television System Committee).

Nowadays, editing private images using a video editing software through personal computers (hereinafter, "PC"), cell phones, and the like becomes possible. PCs and cell phones have various numbers of pixels of display screen and sizes thereof, so that the number of scanning lines also varies. Accordingly, in image editing, in addition to a conversion process into the foregoing progressive image, a scaling process of the progressive image (i.e., increasing/decreasing process of the scanning lines) are performed.

More specifically, the conversion process converts interlacing image data which is an original image into progressive image data by performing an inter-field interpolation process. The scaling process inserts scanning line data in the field at an appropriate interval (e.g., one line for each three lines) corresponding to the enlargement ratio of a screen (e.g., 360 lines to 480 lines) to the converted progressive image data.

Eventually, as odd-number lines are extracted in odd-number fields and even-number lines are extracted in even-number fields, the enlarged progressive image data is converted into interlacing image again. As shown in FIG. 21, the interlacing image data has scanning line data of an odd-number field (field 1) and scanning line data of an even-number field (field 2) mixed in the interlacing image date four line by four line.

As shown in FIG. 22, an explanation will be given of an example case in which a motion image that a vertical bar scrolls from the left to the right on the display is edited as an original image. FIGS. 23A to 23C are enlarged views of interlacing image data corresponding to the original image shown in FIG. 22. When inter-field scanning line interpolation is performed on those pieces of image data and the image data is enlarged, as shown in FIGS. 24A to 24C, image data having scanning lines of previous and next fields mixed therein is generated.

An explanation will now be given of an example case in which a signal processing device which performs in-field scanning line interpolation on a motion image and which performs inter-field scanning line interpolation on a still image displays image data generated thus way. The signal processing device determines that the image data is a frame of a motion image, and performs in-field scanning line interpolation. Accordingly, as shown in FIGS. 25A to 25C, image data having a position of the vertical bar shifted for each four lines is generated. In a display screen, not an image that one vertical bar scrolls from the left to the right (see, FIG. 22), but as shown in FIG. 26, an image that a vertical line waviness (having predetermined distortions) scrolls from the left to the right is displayed.

As explained above, when an image is edited using a video editing software on PCs or cell phones, a defect with interlacing may occur. Image data having a defective interlacing may cause unignorable display failure. Regarding a display failure, even a signal processing device disclosed in Unexamined Japanese Patent Application KOKAI Publication No. H02-196581 cannot cope with it.

SUMMARY

The present invention has been made in view of the foregoing circumstance, and it is an exemplary object of the present invention to provide a video display device, a display control method and a recording medium which suppress any image deterioration originating from image editing through a PC or a cell phone when image data that scanning lines of previous and next fields are mixed therein is displayed.

To achieve the object, a video display device according to a first exemplary aspect of the present invention includes: one or plurality of input paths into which a video stream is input; an inter-field scanning line interpolating unit which superimposes scanning line data of previous and next fields of interlacing image data in the video stream input from an input path among the plurality of input paths to perform inter-field scanning line interpolation, and which generates progressive image data corresponding to the video stream; a determining unit which determines whether or not a reliability of the video stream meets a predetermined level; and a selecting unit which selects image data having undergone interpolation by the inter-field scanning line interpolating unit as an image to be displayed when the determining unit determines that the reliability of the video stream does not meet the predetermined level.

In this case, the determining unit may determine that the reliability of the video stream does not meet the predetermined level when the input path into which the video stream is input is a particular input path.

In this case, the video display device may further include a memory which stores the video stream, wherein the particular input path is an input path into which the video stream read from the memory is input.

Moreover, the video display device may further include a receiving unit which receives the video stream via a communication network, wherein the particular input path is an input path into which the video stream received by the receiving unit is input.

The determining unit may determine whether or not the reliability of the video stream meets the predetermined level based on identification information of the video stream.

In this case, the identification information may be in a header of the video stream, the determining unit may include an extracting unit which extracts the identification information from the header, and the determining unit may determine whether or not the reliability of the video stream meets the predetermined level based on the identification information extracted by the extracting unit.

The identification information may be in a file name or an extension name of the video stream, the determining unit may include an extracting unit which extracts the identification information from the file name or the extension name, and the determining unit may determine whether or not the reliability of the video stream meets the predetermined level based on the identification information extracted by the extracting unit.

The video display device may further include an in-field scanning line interpolating unit which performs interpolation on interlacing image data in the video stream using scanning line data in the same field, wherein the determining unit includes a waviness detecting unit which detects a waviness of an image in the video stream based on first image data generated by the inter-field scanning line interpolating unit and second image data generated by the in-field scanning line interpolating unit, and the determining unit determines that the reliability of the video stream does not meet the predetermined level upon detection of a waviness of an image by the waviness detecting unit.

In this case, the waviness detecting unit may detect a waviness of an image when a total number of spatial frequency components which are equal to or lower than a predetermined frequency and which are in differential image data between the first image data and the second image data is equal to or greater than a predetermined number.

The video display device may further include: an in-field scanning line interpolating unit which performs interpolation on interlacing image data in the video stream using scanning line data in the same field; and a motion adapting unit into which image data output by the inter-field scanning line interpolating unit and image data output by the in-field scanning line interpolating unit are input, which applies image data output by the in-field scanning line interpolating unit to a part having a motion in the two pieces of image data, and which outputs image data, to which the image data output by the inter-field scanning line interpolating unit is applied, or a part having no motion in the image data, wherein the selecting unit selects image data output by the motion adapting unit as an image to be displayed when the determining unit determines that the reliability of the video stream meets the predetermined level.

A video display device according to a second exemplary aspect of the present invention includes:

one or plurality of input path means into which a video stream is input;

an inter-field scanning line interpolating means which superimposes scanning line data of previous and next fields of interlacing image data in the video stream input from an input path among the plurality of input paths to perform inter-field scanning line interpolation, and which generates progressive image data corresponding to the video stream;

a determining means which determines whether or not a reliability of the video stream meets a predetermined level; and a selecting means which selects image data having undergone interpolation by the inter-field scanning line interpolating means as an image to be displayed when the determining means determines that the reliability of the video stream does not meet the predetermined level.

A display control method according to a third exemplary aspect of the present invention is for a video display device, the video display device including: one or plurality of input paths into which a video stream is input; and an inter-field scanning line interpolating unit which superimposes scanning line data of previous and next fields of interlacing image data in the video stream input from an input path among the plurality of input paths to perform inter-field scanning line interpolation, and which generates progressive image data corresponding to the video stream, the display control method including: a determining step of determining whether or not a reliability of the video stream meets a predetermined level; and a selecting step of selecting image data having undergone interpolation by the inter-field scanning line interpolating unit as an image to be displayed when it is determined in the determining step that the reliability of the video stream does not meet the predetermined level.

A recording medium according to a fourth exemplary aspect of the present invention stores a program for a computer that controls a video display device, the video display device including: one or plurality of input paths into which a video stream is input; and an inter-field scanning line interpolating unit which superimposes scanning line data of previous and next fields of interlacing image data in the video stream input from an input path among the plurality of input paths to perform inter-field scanning line interpolation, and which generates progressive image data corresponding to the video stream, the program allowing the computer to function as: a determining unit which determines whether or not a reliability of the video stream meets a predetermined level; and a selecting unit which selects image data having undergone interpolation by the inter-field scanning line interpolating unit as an image to be displayed when the determining unit determines that the reliability of the video stream does not meet the predetermined level.

According to the present invention, when it is determined that the reliability of a video stream is lower than a predetermined level, inter-field scanning line interpolation is applied as an interpolation technique of converting interlacing image data in that video stream into progressive image data. Accordingly, periodical distortion of image data caused by image editing in the scanning line direction can be blurred. Therefore, it is possible to suppress any image deterioration when image data that scanning lines of previous and next fields are mixed therein is displayed, thereby enabling a good image display.

BRIEF DESCRIPTION OF THE DRAWINGS

A more complete understanding of this application can be obtained when the following detailed description is considered in conjunction with the following drawings, in which:

FIG. 4A shows an example progressive image data generated by inter-field scanning line interpolation;

FIG. 4B shows an example progressive image data generated by inter-field scanning line interpolation;

FIG. 7 is a table showing an example data format of a header of a video stream;

FIG. 14A is a diagram showing example image data output by an in-field scanning line interpolating unit;

FIG. 14B is a diagram showing example image data output by the in-field scanning line interpolating unit;

FIG. 14C is a diagram showing example image data output by the in-field scanning line interpolating unit;

FIG. 16 is a flowchart for an operation (a fourth determination/selection process) executed by a distortion detecting unit in FIG. 12;

FIG. 17A is an exemplary diagram for explaining interlacing image data;

FIG. 17B is an exemplary diagram for explaining interlacing image data;

FIG. 19A is an exemplary diagram for explaining in-field scanning line interpolation;

FIG. 19B is an exemplary diagram for explaining in-field scanning line interpolation;

FIG. 24A is an enlarged view of progressive image data generated by an inter-field scanning line interpolation process and an enlargement process;

FIG. 24B is an enlarged view of progressive image data generated by an inter-field scanning line interpolation process and an enlargement process;

FIG. 24C is an enlarged view of progressive image data generated by an inter-field scanning line interpolation process and an enlargement process;

EXEMPLARY EMBODIMENT

A video display device according to an embodiment of the present invention will be explained below with reference to the accompanying drawings. The explanation below will be given of an example case in which the video display device of the present invention is a mobile terminal like a cell phone.

<First Embodiment>

The first embodiment of the present invention will be explained at first.

Figure 1:
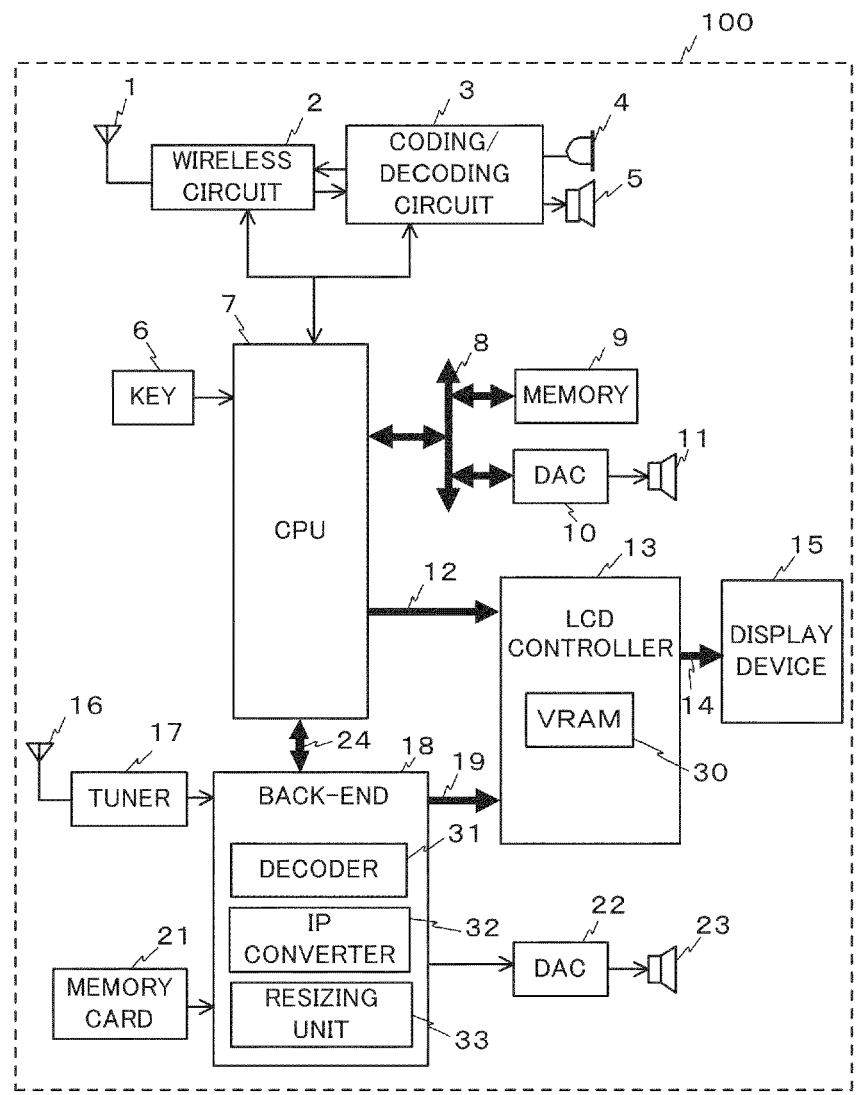
FIG. 1 is a block diagram showing a configuration of a mobile terminal according to a first embodiment of the present invention.

As shown in FIG. 1, a mobile terminal 100 of the present embodiment comprises a communication antenna 1, a wireless circuit 2, a coding/decoding circuit 3, a microphone 4, a receiver 5, a key 6, a CPU (Central Processing Unit) 7, a CPU bus 8, a memory 9, a DAC (Digital/Analog Converter) 10, a speaker 11, a video I/F 12, an LCD (Liquid Crystal Display) controller 13, a video I/F 14, and a display device 15.

The communication antenna 1 receives a radio wave transmitted in air, and converts the radio wave into a high-frequency electrical signal. The converted high-frequency electrical signal is supplied to the wireless circuit 2. Moreover, the communication antenna 1 converts a high-frequency electrical signal supplied from the wireless circuit 2 into a radio wave, and transmits the radio wave in air.

The wireless circuit 2 demodulates the high-frequency electrical signal converted by the communication antenna 1, and outputs the demodulated signal to the coding/decoding circuit 3. Moreover, the wireless circuit 2 converts an output signal by the coding/decoding circuit 3 into a high-frequency electrical signal, and outputs the converted high-frequency electrical signal to the communication antenna 1.

The coding/decoding circuit 3 performs decoding on the output signal by the wireless circuit 2. The coding/decoding circuit 3 outputs a calling sound signal acquired as a result from the decoding to the receiver 5. Moreover, the coding/decoding circuit 3 outputs character data, image data, and the like acquired from the same scheme to the CPU 7.

Furthermore, the coding/decoding circuit 3 performs coding on a sound signal from the microphone 4, character data input by an operation of the key 6 and output by the CPU 7, and image data read-out from the memory 9 and output by the CPU 7. Various data acquired as a result from the coding is output as an output signal to the wireless circuit 2.

The CPU 7 controls the individual structural elements of the mobile terminal 100 overall. For example, the CPU 7 detects the content of an operation of the key 6, controls the wireless circuit 2 and the coding/decoding circuit 3 in accordance with the detected key operation, thereby to enable a verbal communication and to reproduce music or images.

The memory 9 is connected to the CPU 7 via the CPU bus 8. The memory 9 stores various control programs, and a database is built therein. More specifically, the memory 9 stores data, such as a telephone book or an address book, sound data, such as a ringer melody or music, image data, such as a motion image or a still image, and the like.

The CPU 7 acquires a program from the memory 9 via the CPU bus 8, and runs the program, thereby controlling the individual structural elements of the mobile terminal 100 overall. The CPU 7 controls the coding/decoding circuit 3, the wireless circuit 2, and the like, and executes, for example, a process relating to incoming-call standby. When a call is coming, the CPU 7 reads out the name of a caller from the telephone book in the memory 9, a ringer melody, and an incoming image and the like, and executes an incoming-call process.

As will be discussed later, the CPU 7 detects an input path into which a video stream is input, and functions as a determination unit which checks the reliability of the video stream based on the detection result.

The DAC 10 is connected to the CPU 7 via the CPU bus 8. The CPU 7 outputs sound data to the DAC 10 via the CPU bus 8. The DAC 10 converts a digital sound signal, such as a ring tone or a calling sound, into an analog signal, and supplies the analog signal to the speaker 11. The speaker 11 outputs a ring tone or a calling sound corresponding to the analog signal supplied from the DAC 10.

The CPU 7 outputs the phone number of a communication party, the name thereof, image data, and the like to the LCD controller 13 via the video I/F 12. An example of the video I/F 12 is a parallel bus of CMOSs, but recently, there is a trend for employing a differential serial bus from the standpoint of reduction of the number of signal lines and of noises.

The LCD controller 13 includes a built-in VRAM (Video RAM) 30. The VRAM 30 has a capacity capable of storing images by what corresponds to one screen or two screens. Using the VRAM 30, the LCD controller 13 synthesizes either one of or both of image data intermittently or partially supplied from the CPU 7 (or a back-end 18 to be discussed later) to generate a frame image. Furthermore, the LCD controller 13 successively reads out the frame image at a frequency of 60 Hz or so, and outputs such an image to the display device 15 via the video I/F 14.

The video I/F 14 can be a differential serial bus like the video I/F 12, but in the present embodiment, a parallel bus of CMOSs is employed as the video I/F 14.

A stripe-type display device having a pixel configured by three pixels of RGB is used as the display device 15. More specifically, devices with various numbers of pixels, such as QVGA (320×240×RGB), VGA (640×480×RGB), wide VGA (800×480×RGB), or full-wide VGA (854×480×RGB) can be used as the display device 15. In the present embodiment, it is presumed that VGA (640×480×RGB) is adopted. Moreover, let us suppose that the display device 15 is a liquid crystal display in the present embodiment.

In addition to the foregoing structural elements, the mobile terminal 100 further includes a television antenna 16, a tuner 17, a back-end 18, a video I/F 19, a memory card 21, a DAC 22, a speaker 23, and a back-end I/F 24.

The tuner 17 decodes a video/sound stream from a radio wave of television broadcasting received by the television antenna 16, and outputs such stream to the back-end 18.

The back-end 18 comprises a decoder 31, an IP converter 32, and a resizing unit 33.

The decoder 31 has two input paths: an input path into which a video/sound stream is input from the tuner 17; and an input path into which a video/sound stream is input from the memory card 21. The decoder 31 decodes a video/sound stream input from the tuner 17, and divides it into image data (video data) and sound data.

The IP converter 32 converts interlacing image data acquired as a result from the decoding into progressive image data. This conversion is called a progressive conversion (hereinafter, an "IP conversion").

The resizing unit 33 performs scaling, i.e., resizing on image data so that the image data matches the number of pixels of the display device 15. The resized image data is output to the LCD controller 13 via the video I/F 19.

The video I/F 19 can be a differential serial bus like the video I/F 12, but in the present embodiment, a parallel bus of CMOSs is adopted as the video I/F 19 like the video I/F 17. Conversely, sound data decoded by the decoder 31 is output from the speaker 23 via the DAC 22.

The memory card 21 can retain still images, animation image files, and files of sound only, in addition to motion image streams that the foregoing image and sound are multiplexed. The back-end 18 can perform the foregoing process on video/sound streams read out from the memory card 21.

A back-end I/F 24 is provided between the back-end 18 and the CPU 7. A control command for a device connected to the back-end 18, etc., image/sound data and the like are exchanged between the back-end 18 and the CPU 7 via the back-end I/F 24.

An explanation will be given of a detailed configuration of the back-end 18. As explained above, the back-end 18 includes the decoder 31, the IP converter 32, and the resizing unit 33.

The decoder 31 decodes video streams input from the tuner 17 or from the memory card 21, and outputs image data acquired as a result from the decoding to the IP converter 32. It is presumed that image data of the video stream is interlacing image data.

FIG. 17A shows field 1 which is an odd-number field of the image data. In field 1, scanning lines are arranged in odd-number lines like line 1, line 3, line 5, and the like. In contrast, FIG. 17B shows field 2 which is an even-number field of the image data. In field 2, scanning lines are arranged in even-number lines like line 2, line 4, line 6, and the like.

Figure 2:
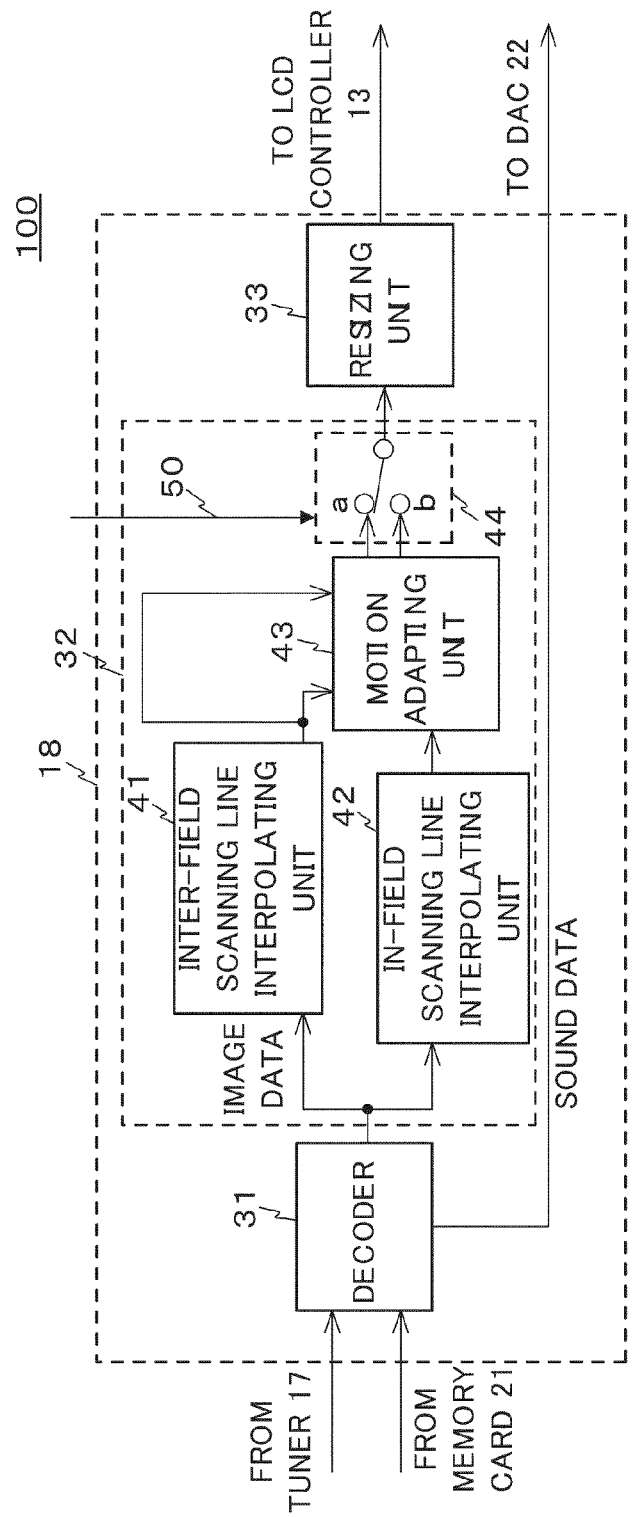
FIG. 2 is a block diagram showing a detailed configuration of a back-end in FIG. 1.

As shown in FIG. 2, the IP converter 32 includes an inter-field scanning line interpolating unit 41, an in-field scanning line interpolating unit 42, a motion adapting unit 43, and a selector 44 as a selecting unit. A video signal input into the IP converter 32 is input into both of the inter-field scanning line interpolating unit 41 and the in-field scanning line interpolating unit 42.

Figure 18A:
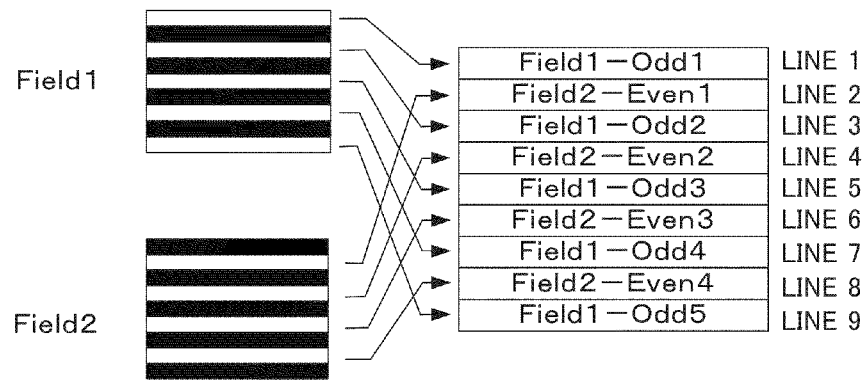
FIG. 18A is an exemplary diagram for explaining inter-field scanning line interpolation.
Figure 18B:
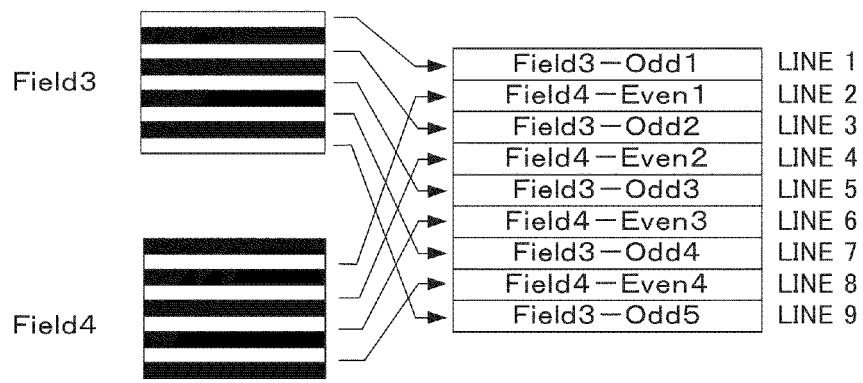
FIG. 18B is an exemplary diagram for explaining inter-field scanning line interpolation.

As shown in FIGS. 18A, 18B, the inter-field scanning line interpolating unit 41 superimposes scanning line data of previous and next fields of interlacing image data in a video stream (in FIG. 18A, odd-number lines of field 1 and even-number lines of field 2, and in FIG. 18B, odd-number lines of field 3 and even-number lines of field 4) together to interpolate a space between the scanning lines, thereby generating progressive image data. Image data generated by interpolation is output to the motion adapting unit 43.

A highly-fine image can be acquired through inter-field scanning line interpolation because a space between scanning lines in each field is interpolated by a scanning line of a following field. According to inter-field scanning line interpolation, however, because fields different from one another in time are superimposed together and simultaneously displayed, a motion part in the image becomes a duplex image. Therefore, inter-field scanning line interpolation is proper for still image display.

As shown in FIGS. 19A, 19B, the in-field scanning line interpolating unit 42 superimposes scanning line data in the same field of interlacing image data of a video stream to interpolate a space between the scan lines, thereby generating progressive image data. Image data generated by interpolation is output to the motion adapting unit 43.

In-field scanning line interpolation interpolates a space between scanning lines in each field with scanning line data (more specifically, scanning data right above) in the same field. Although the resolution is reduced, but no duplex image is produced even if the image has a motion. Accordingly, the in-field scanning line interpolation is proper for motion image display.

The motion adapting unit 43 detects a motion (a change) in the generated progressive image data, and determines whether such image data is a still image or a motion image. When determining that such progressive image data is a still image, the motion adapting unit 43 outputs image data input from the inter-field scanning line interpolating unit 41 (see, for example, FIGS. 18A, 18B). When determining that such progressive image data is a motion image, the motion adapting unit 43 outputs image data input from the in-field scanning line interpolating unit 42 (see FIGS. 19A, 19B).

Progressive image data generated through inter-field scanning line interpolation is used for still image display. Progressive image data generated through in-field scanning line interpolation is used for motion image display. Accordingly, any duplexing of an image is suppressed, and a highly-fine image can be displayed regardless of a motion in the image.

The selector 44 selectively outputs image data input from the inter-field scanning line interpolating unit 41 or image data input from the motion adapting unit 43 based on an IP conversion selecting signal 50 output by the CPU 7.

Figure 20:
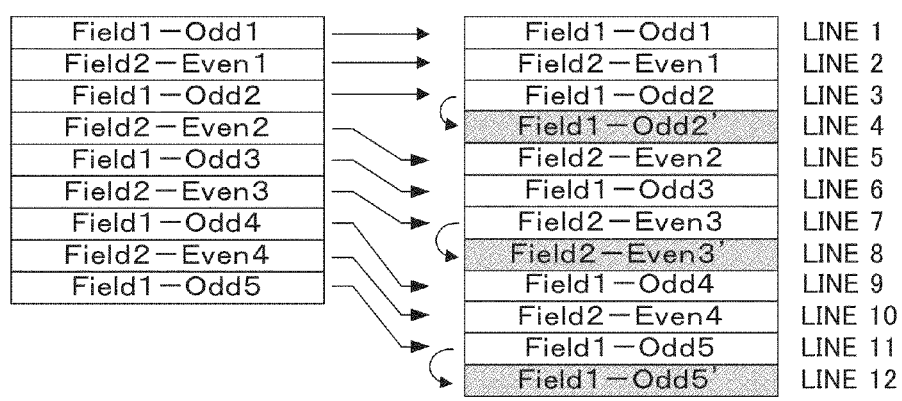
FIG. 20 is an exemplary diagram for explaining an enlargement process.
Figure 21:
FIG. 21 is an exemplary diagram for explaining a conversion process of enlarged image data into interlacing image data.

The resizing unit 33 enlarges or reduces the size of an image as needed in order to cause the image output by the IP converter 32 to match the number of pixels (in the present embodiment, 640×480) of the display device 15, and outputs the processed image to the LCD controller 13. For example, when image data with 360 lines is enlarged to image data with 480 lines, an interpolation scanning line is inserted into image data shown in FIG. 18A for each three lines, and image data shown in FIG. 20 is thus generated. The scaling process of image data can be through other schemes.

When image data input from the tuner 17 is displayed, the CPU 7 outputs an IP-conversion selection signal 50 for selecting an output image by the motion adapting unit 43 to the selector 44. When image data input from the memory card 21 is displayed, the CPU 7 outputs an IP-conversion selection signal 50 for selecting an output image by the inter-field scanning line interpolating unit 41 to the selector 44.

Figure 3:
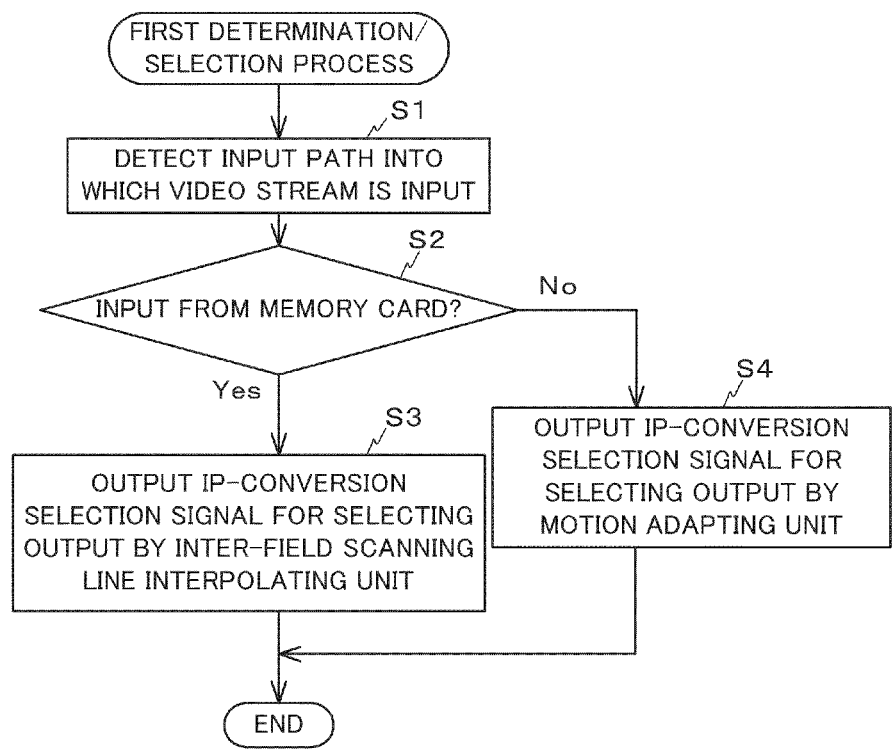
FIG. 3 is a flowchart for a first determination/selection process executed by a CPU of the mobile terminal in FIG. 1.

Next, an explanation will be given of an operation of the mobile terminal 100 of the present embodiment. FIG. 3 is a flowchart for a program (a first determination/selection process) executed by the CPU 7. The program is run when a video stream is input into the back-end 18.

As shown in FIG. 3, first, the CPU 7 detects an input path into which a video stream is input (step S1). It is detected in this step whether a video stream input into the back-end 18 is from the tuner 17 or from the memory card 21.

Subsequently, the CPU 7 determines whether or not the video stream is input from the memory card 21 (step S2). When the video stream is input from the memory card 21 (step S2: YES), the CPU 7 determines that the reliability of the video stream is low, outputs the IP-conversion selection signal 50 for selecting an output by the inter-field scanning line interpolating unit 41 (step S3). When the video stream is input from the tuner 17 (step S2: NO), the CPU 7 determines that the reliability of the video stream is high, and outputs the IP-conversion selection signal 50 for selecting an output by the motion adapting unit 43 (step S4).

After the step S3 or the step S4, the CPU 7 terminates the process.

Figure 22:
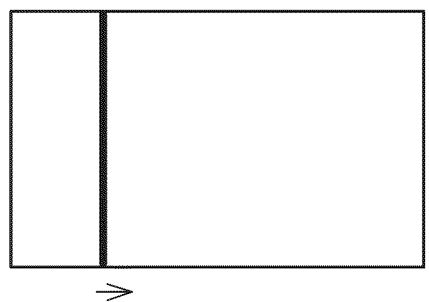
FIG. 22 shows an example motion image as an original image displayed.

Now, as shown in FIG. 22, an explanation will be given of a case in which a motion image that scrolls a vertical line from the left to the right is displayed.

<When Image Data Input from Memory Card 21 is Displayed>

First, an explanation will be given of a case in which the video display device of the present embodiment displays an image based on a video stream input from the memory card 21. In this case, the CPU 7 outputs the IP-conversion selection signal 50 for selecting an output by the inter-field scanning line interpolating unit 41 to the selector 44 (step S3). When receiving the IP-conversion selection signal 50, the selector 44 outputs image data input from the inter-field scanning line interpolating unit 41 to the resizing unit 33.

That is, in the present embodiment, inter-field scanning line interpolation is always performed on a video stream input from the memory card 21. An explanation will be given of an example case in which image data in the video stream input from the memory card 21 is edited image data having scanning lines of the previous and next fields mixed together (see, for example, FIGS. 24A to 24C).

In this case, progressive data containing image data of FIG. 24A and image data of FIG. 22B synthesized together is generated and progressive data containing image data of FIG. 24B and image data of FIG. 24C synthesized together is generated. Those pieces of progressive data are image data that a vertical bar has an edge in a comb-like shape with a fine period for each one line as shown in FIGS. 4A and 4B.

Figure 5:
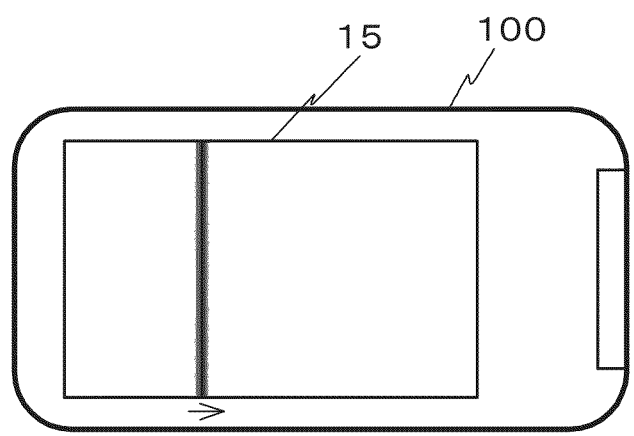
FIG. 5 shows an example motion image actually displayed.

It is requisite for the mobile terminal 100 to be compact as a whole, so that the physical size of the display screen of the display device 15 is small. As the display screen is small, the comb-like portions in FIGS. 4A and 4B have a period extremely small. Accordingly, as shown in FIG. 5, the comb-like portions are perceived merely as a slight blur.

Therefore, according to the present embodiment, when a video stream possibly edited by a video editing software or the like, i.e., a video stream input from the memory card 21 is played, the selector 44 selects image data input from the inter-field scanning line interpolating unit 41, and outputs that image data to the resizing unit 33. This makes it possible for the mobile terminal 100 to suppress any extraordinary image deterioration.

<When Image Data Input from Tuner 17 is Displayed>

Next, an explanation will be given of a case in which the video display device of the present embodiment displays an image based on a video stream input from the tuner 17. In this case, the CPU 7 outputs the IP-conversion selection signal 50 for selecting an output by the inter-field scanning line interpolating unit 41 to the selector 44 (step S3). When receiving the IP-conversion selection signal 50, the selector 44 outputs image data input from the motion adapting unit 43 to the resizing unit 33.

The video stream input from the tuner 17 is transmitted from a broadcasting station, so that the reliability of image data in the video stream is very high. Thus, there is an extremely low possibility that image data in the video stream is image data containing scanning lines of the previous and next fields mixed together. Accordingly, when the video stream input from the tuner 17 is played, the selector 44 selects image data output by the motion adapting unit 43, and outputs such image data to the resizing unit 33.

As explained above, the motion adapting unit 43 detects a change in image data, outputs image data input from the in-field scanning line interpolating unit 42 when the image data is a motion image, and outputs image data input from the inter-field scanning line interpolating unit 41 when the image data is a still image. The motion adapting unit 43 prevents the resolution of a still image from decreasing, and suppresses any generation of a distortion of an image in a motion image. This enables highly-fine image display.

As explained above, the reliability of image data in a video stream input from the tuner 17 is extremely high. In contrast, image data in a video stream input from the memory card 21 is possibly edited image data containing scanning lines of the previous and next fields mixed together, and it is not always true that the reliability thereof is high. Therefore, determination by the CPU 7 of whether the input path into which a video stream is input being the input path from the tuner 17 or the input path from the memory card 21 means that it is determined whether or not the reliability of the video stream is equal to or lower than a predetermined level.

When the video stream is input from the memory card 21, image data with distortion may be mixed, so that the CPU 7 determines that the reliability of the video stream is lower than the predetermined level. In this case, the video display device of the present embodiment always displays with image data having undergone inter-field scanning line interpolation.

The mobile terminal 100 of the present embodiment has two input paths into which a video stream is input, but the number of input paths may be one or equal to or greater than three. For all input paths, image data has a reliability set beforehand based on whether or not the image data input into that input path may possibly contain edited image data having scanning lines of the previous and next fields mixed, and the CPU 7 performs determination based on the set reliability.

As explained above, according to the present embodiment, when it is determined that the reliability of a video stream is lower than the predetermined level, inter-field scanning line interpolation is always applied as an interpolation scheme of converting interlacing image data in that video stream into progressive image data. Accordingly, a periodical distortion (heave) of image data generated by video editing in the scanning line direction can be blurred. This makes it possible for the mobile terminal to suppress any image deterioration (waviness of an image) when image data containing scanning lines of the previous and next fields mixed together is displayed, thereby enabling good image display.

Regarding a video stream input from the tuner 17, inter-field scanning line interpolation and in-field scanning line interpolation are both applied depending on the motion of an image, thereby enabling image display with a high image quality.

The mobile terminal 100 of the present embodiment has the tuner 17 and the memory card 21 both connected to the back-end 18 side. The present invention is, however, not limited to this configuration. For example, either one of or both of the tuner 17 and the memory card 21 may be connected to the CPU 7, and a control command, a video, sound data and the like may be exchanged therewith via the back-end I/F 24 to realized the above-explained operation.

<Second Embodiment>

Next, an explanation will be given of the second embodiment of the present invention. The mobile terminal 100 of the present embodiment differs from the mobile terminal 100 of the first embodiment that the back-end 18 has a different configuration.

Figure 6:
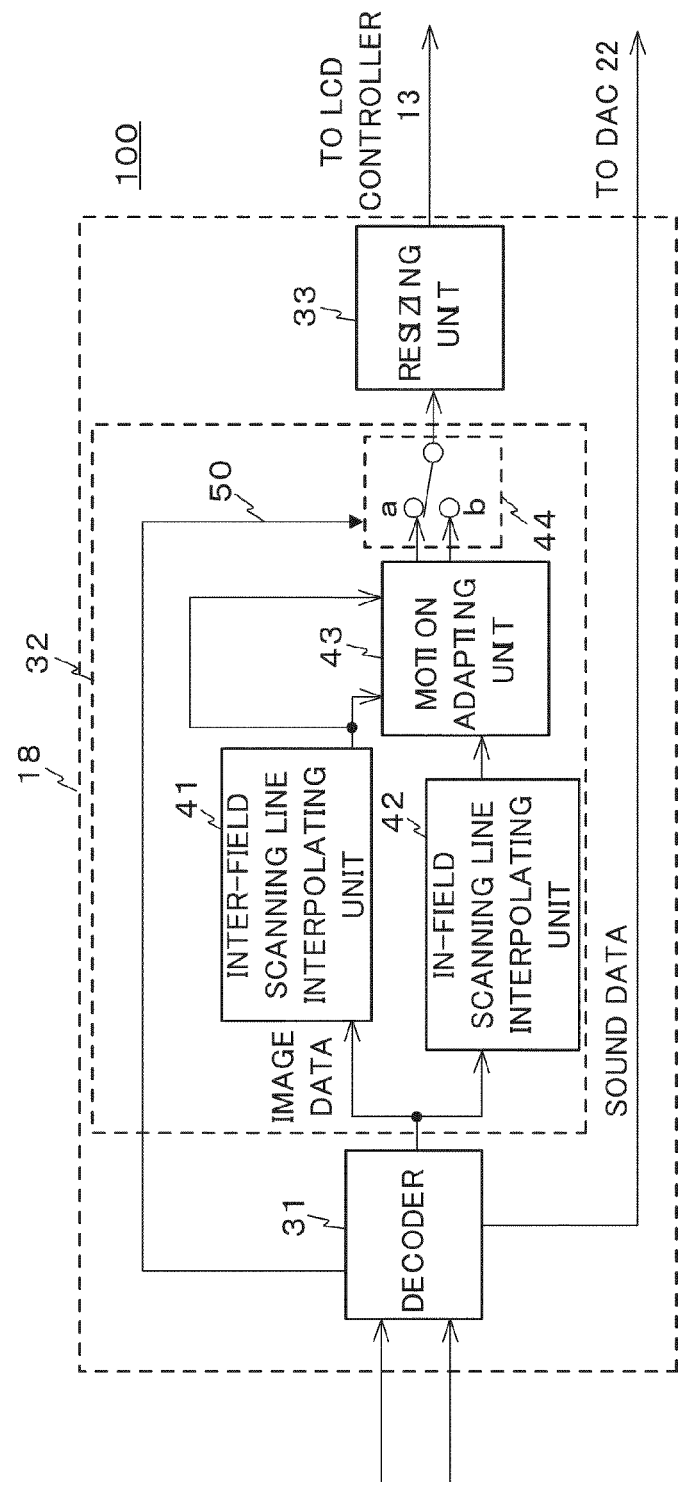
FIG. 6 is a block diagram showing a configuration of a back-end of a mobile terminal according to a second embodiment of the present invention.

FIG. 6 shows the configuration of the back-end 18 of the present embodiment. As shown in FIG. 6, the IP-conversion selection signal 50 is output by the decoder 31, and is input into the selector 44.

In the first embodiment, the selector 44 is switched over in response to an instruction from the CPU 7 depending on an input path of a video stream. In contrast, according to the present embodiment, information for specifying a scanning line interpolation scheme is set in the header of a video stream. When a video stream from the memory card 21 is played, the decoder 31 controls the selector 44 based on that information.

FIG. 7 shows an example table indicating how identification information for specifying a scanning line interpolation scheme is inserted into the header of a video stream. As shown in FIG. 7, in the header of the video stream, a video format is set as a first item. According to this example, "YUV: 422" is set as the content of the video format.

The number of pixels is set as a following second item. According to this example, "640 (H)×480 (V)" is set as the number of pixels.

An VP (Interlace/Progressive) is set as a following third item. "Interlace" is set as the I/P.

A scanning line interpolation scheme is set as a following fourth item. According to this example, "1" is set as the scanning line interpolation scheme. When the item is "1", it is determined that a video stream is not edited and motion adapting interpolation is possible. The motion adapting interpolation is an interpolation scheme of applying in-field scanning line interpolation on a part having a motion in an image which can be regarded as a motion image, and of applying inter-field scanning line interpolation on a part having no motion in an image which can be regarded as a still image. In the case of a video stream generated by recording and is not subjected to editing, or of a video stream edited with a normal interlacing structure being maintained, the item (scanning line interpolation scheme) is set to "1" by a recording device or by a video editing software. This item (scanning line interpolation scheme) is the identification information of a video stream.

When a video stream is played, the decoder 31 extracts data of this item. When the extracted data is "1", the decoder 31 outputs the IP-conversion selection signal 50 for selecting an output image by the motion adapting unit 43 to the selector 44. When the extracted data is not "1", the decoder 31 outputs the IP-conversion selection signal 50 for selecting an output image by the inter-field scanning line interpolating unit 41 to the selector 44. Like the first embodiment, the selector 44 switches image data to be output to the resizing unit 33 in accordance with the IP-conversion selection signal 50.

Figure 8:
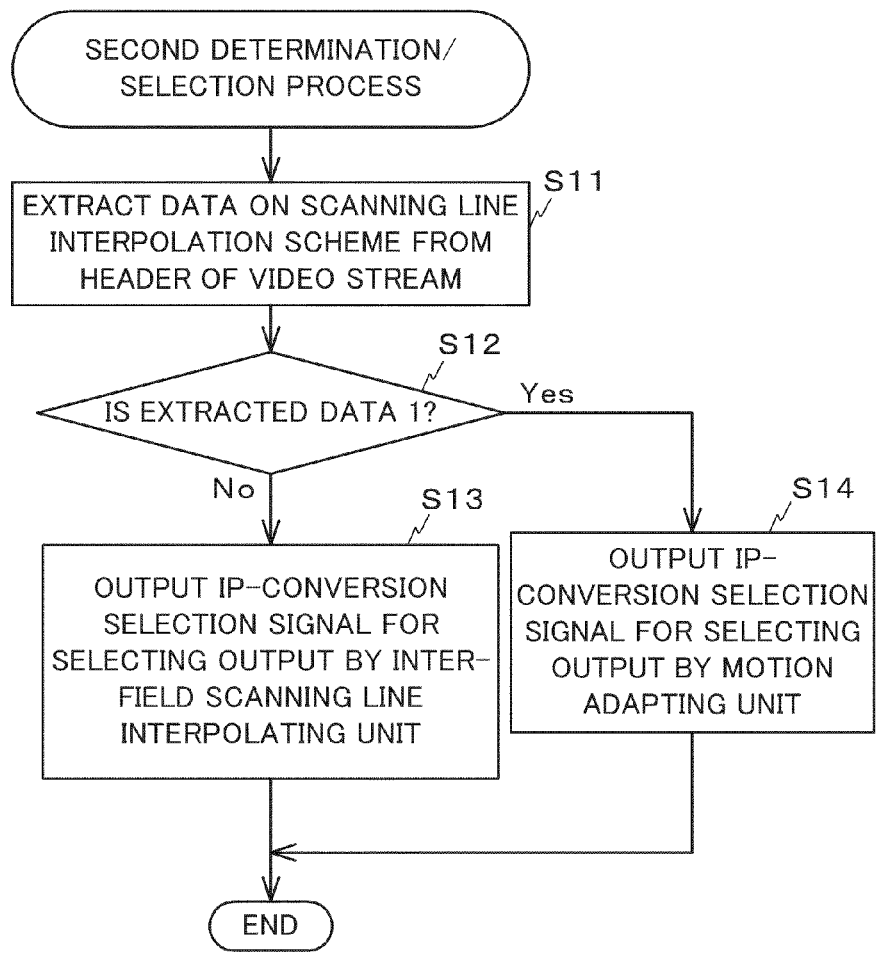
FIG. 8 is a flowchart for a second determination/selection process executed by a decoder in FIG. 6.

Next, an explanation will be given of an operation of the mobile terminal 100 of the present embodiment. FIG. 8 is a flowchart for a program (a second determination/selection process) executed by the decoder 31. This program is run when inputting of a video stream into the back-end 18 is started.

As shown in FIG. 8, first, the decoder 31 extracts data on a scanning line interpolation scheme from the header of a video stream (step S11). The data extracted in this step indicates whether or not the video stream has a high reliability which has not been subjected to editing.

Subsequently, the decoder 31 determines whether or not the extracted data is "1" (step S12). When the extracted data is not "1" (step S12: NO), the decoder 31 outputs the IP-conversion selection signal 50 for selecting an output by the inter-field scanning line interpolating unit 41 to the selector 44 (step S13). When the extracted data is "1" (step S12: YES), the decoder 31 outputs the IP-conversion selection signal 50 for selecting an output by the motion adapting unit 43 to the selector 44 (step S14).

After the steps S13, S14, the decoder 31 terminates the process.

In the present embodiment, the reliability of a video stream is determined on the basis of the attribute of the video stream itself. Accordingly, even if a video stream input from the memory card 21 is subjected to display, when it is determined that the reliability of that video stream itself is high, a video is displayed based on image data output by the motion adapting unit 43. As a result, displaying of a blurred image is suppressed as much as possible.

Conversely, regarding a video stream input from the tuner 17, an IP converter 72 outputs progressive image data through a motion adapting interpolation like the first embodiment.

As is clear from the foregoing explanation, the step S11 which is an operation of the decoder 31 corresponds to an extracting unit.

As explained above, according to the present embodiment, regarding a part of a video stream input from the memory card 21, in addition to a video stream input from the tuner 17, progressive image data output by the motion adapting unit 43 is selected, thereby enabling display with a high image quality. The part of the video stream is a video stream having identification information (scanning line interpolation scheme) indicating that the video stream has not been edited (i.e., the reliability thereof is high) and set in the header of that video stream among video streams input from the memory card 21.

Note that when the decoder 31 or the like misses to acquire the identification information (data on a scanning line interpolation scheme) in the header of a video stream, it is desirable that the decoder 31 or the like should output the IP-conversion selection signal 50 for selecting an output by the inter-field scanning line interpolating unit 41. This is because it can prevent an image from being distorted severely. The same is true for a case in which the identification information of a video stream is acquired but an acquired value is improper.

If analysis of the header of a video stream is difficult, it is appropriate if identification information indicating that an image has been edited normally may be set beforehand in the file name of the video stream or a part thereof. In this case, the decoder 31 extracts identification information from the file name or the like, and determines the reliability of the video stream based on the extracted data.

When airwaves are recorded, it is general that the extension of a recorded video stream is set to be (***.ts). Hence, the extension of the video stream may be used as the identification information. Needless to say, other exclusive extensions can be also used as the identification information.

In the present embodiment, the decoder 31 analyzes the header of a video stream. However, the present invention is not limited to this configuration. For example, the CPU 7 may analyze the header of a video stream, and may directly control the selector 44 via the back-end I/F 24. Moreover, the selector 44 may be controlled indirectly as the CPU 7 gives a control command to the decoder 31.

<Third Embodiment>

Next, an explanation will be given of the third embodiment of the present invention.

In the first embodiment, the selector 44 is switched based on whether an input path of a video stream is from the tuner 17 or from the memory card 21. In contrast, in the present embodiment, the selector 44 is switched based on whether an input path of a video stream is from the tuner 17 or from a wireless communication network via the wireless circuit 2.

Figure 9:
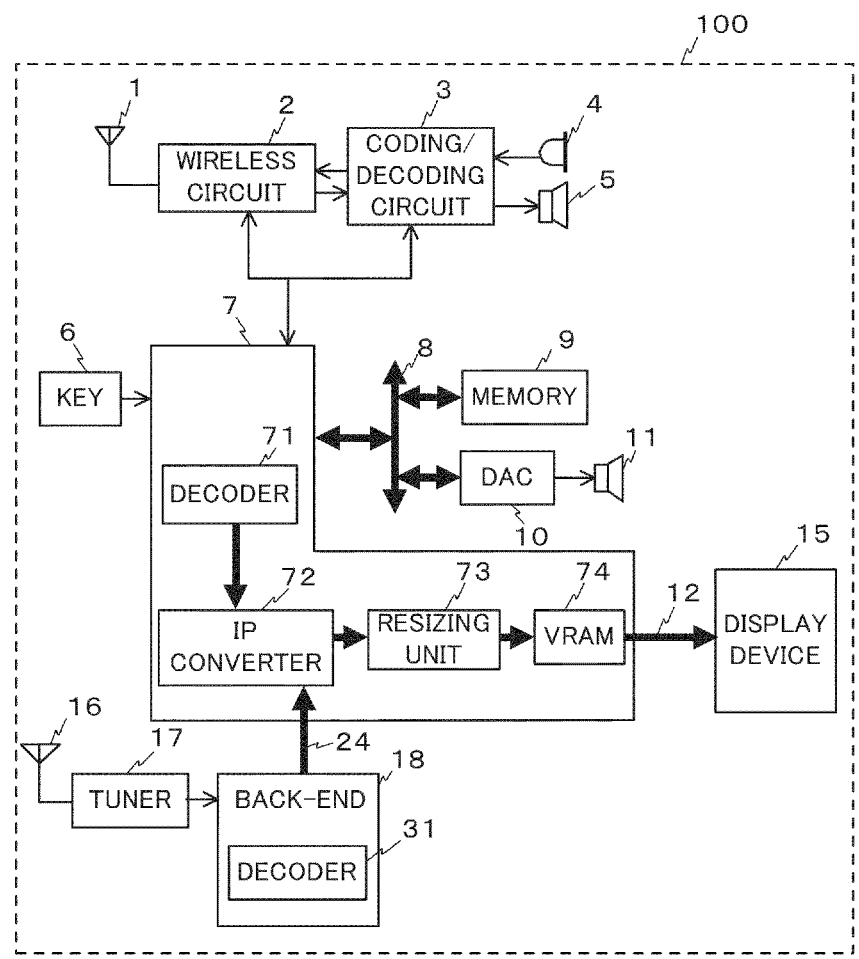
FIG. 9 is a block diagram showing a configuration of a mobile terminal according to a third embodiment of the present invention.

As shown in FIG. 9, the mobile terminal 100 of the present embodiment has the CPU 7 including a decoder 71, an IP converter 72, a resizing unit 73, and a VRAM 74 all built in the CPU 7. Those structural elements are realized as the CPU 7 runs a program stored in the memory 9.

The decoder 71 acquires a video stream received from the wireless communication network from the wireless circuit 2. The decoder 71 decodes the acquired video stream, and outputs image data thereof. The IP converter 72 performs IP conversion on the image data in the video stream. The function of the IP converter 72 is same as that of the IP converter 32 in the first embodiment. That is, the IP converter 72 outputs either one of progressive image data generated through inter-field scanning line interpolation or progressive image data generated through motion adapting interpolation to the resizing unit 73.

However, because the IP converter 72 is built in the CPU 7, the IP converter 72 does not need to output the IP-conversion selection signal 50. In the present embodiment, the IP converter 72 itself determines the reliability of a video stream. Moreover, the IP converter 72 itself selects either one of the progressive image data generated through inter-field scanning line interpolation or the progressive image data generated through motion adapting interpolation based on its own determination, and outputs the selected image data.

Video contents acquired through a wireless communication network include video contents having a low reliability, e.g., video contents edited personally. Among those pieces of video contents, there are present video contents having an image distorted as shown in FIGS. 24A to 24C for example. Therefore, in the present embodiment, the IP converter 72 performs inter-field scanning line interpolation on video contents acquired through the wireless communication network to generate progressive image data, and outputs the generated progressive image data to the resizing unit 73.

Conversely, a video stream input from the tuner 17 is decoded by the decoder 31 of the back-end 18, and input into the IP converter 72 in the CPU 7 via the back-end I/F 24. Regarding the video stream input from the tuner 17, when it is a motion image, the IP converter 72 performs in-field scanning line interpolation, and when it is a still image, the IP converter 72 performs inter-field scanning line interpolation.

The IP converter 72 generates progressive image data, and outputs the generated progressive image data to the resizing unit 73.

The progressive image data is expanded in the VRAM 74, and output to the display device 15 via the video I/F 12. Sound data output by the decoder 71 and sound data transferred from the decoder 31 to the CPU 7 via the back-end I/F 24 are both output to the speaker 11 via the DAC 10 at the CPU 7 side.

Figure 10:
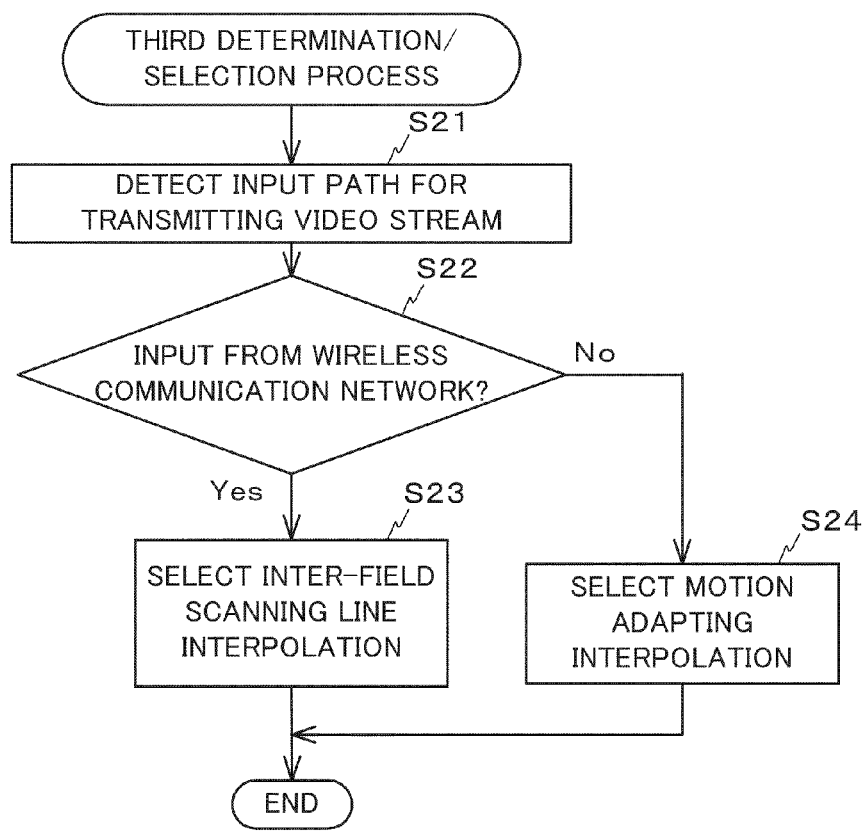
FIG. 10 is a flowchart for a third determination/selection process executed by a CPU of the mobile terminal in FIG. 9.

FIG. 10 is a flowchart for a program (a third determination/selection process) executed by the CPU 7. This program is run when inputting of a video stream into the CPU 7 is started.

As shown in FIG. 10, first, the CPU 7 detects an input path into which a video stream is input (step S21). It is detected whether the video stream input into the CPU 7 is from the tuner 17 or from the wireless communication network through the wireless circuit 2.

Next, the CPU 7 determines whether or not the video stream is input from the wireless communication network (step S22). When the video stream is input from the wireless communication network (step S22: YES), the IP converter 72 in the CPU 7 selects inter-field scanning line interpolation as an interpolation scheme of generating progressive image data (step S23). Conversely, when the video stream is input from the tuner 17 (step S22: NO), the IP converter 72 selects motion adapting interpolation as an interpolation scheme of generating progressive image data (step S24).

After the steps S23 and S24, the CPU 7 terminates the process.

Figure 11A:
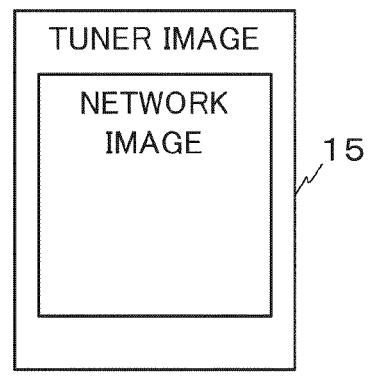
FIG. 11A is an exemplary diagram showing an example display image.
Figure 11B:
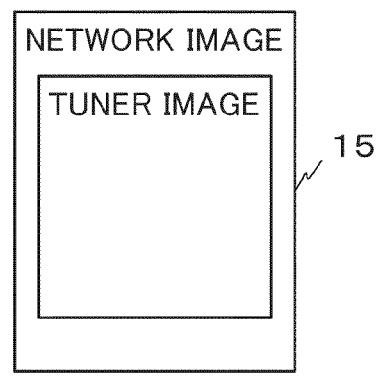
FIG. 11B is an exemplary diagram showing an example display image.

According to the present embodiment, as an output by the decoder 71 and an output by the decoder 31 are processed in a time-shearing manner and written in the VRAM 74, as shown in FIG. 11A, it is possible for the mobile terminal to display a network image in an overlaying manner in a tuner image. Conversely, according to the present embodiment, as shown in FIG. 11B, it is also possible for the mobile terminal to display a tuner image in an overlaying manner in a network image. Furthermore, two images can be arranged in the horizontal direction or in the vertical direction and displayed, and either one of or both of the images can be displayed in an enlarged or reduced manner.

Figure 11C:
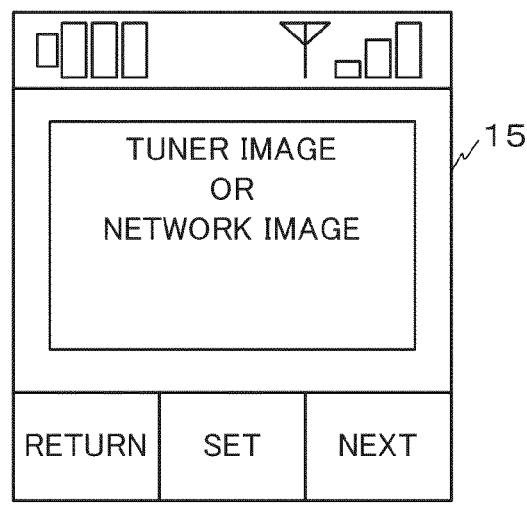
FIG. 11C is an exemplary diagram showing an example display image.

According to the present embodiment, as shown in FIG. 11C, it is possible for the mobile terminal to synthesize a tuner image or a network image with graphics indicating the battery level, an electrical field intensity, and the like, an icon, a soft key, and a background image.

In the present embodiment, the explanation has been given of an example case in which the IP converter 72 and the resizing unit 73 which configure a single system are used in a time-shearing manner. The present invention is, however, not limited to this configuration. For example, IP converters 72 and resizing units 73 for configuring two systems, respectively, may be provided, and an output by the decoder 71 and an output by the decoder 31 may be input into individual systems, and both image data may be eventually synthesized with each other by the VRAM 74.

As explained above, according to the present embodiment, an image corresponding to a video stream input from the tuner 17 is subjected to high-quality image display. In contrast, regarding a video stream input from the wireless communication network, any extraordinary image deterioration is suppressed by suppressing any image waviness.

Moreover, according to the present embodiment, it becomes possible for the mobile terminal to synthesize and display an image from the tuner 17, an image from the wireless communication network, and an image generated by the CPU 7 together.

<Fourth Embodiment>

Next, an explanation will be given of the fourth embodiment of the present invention.

Figure 12:
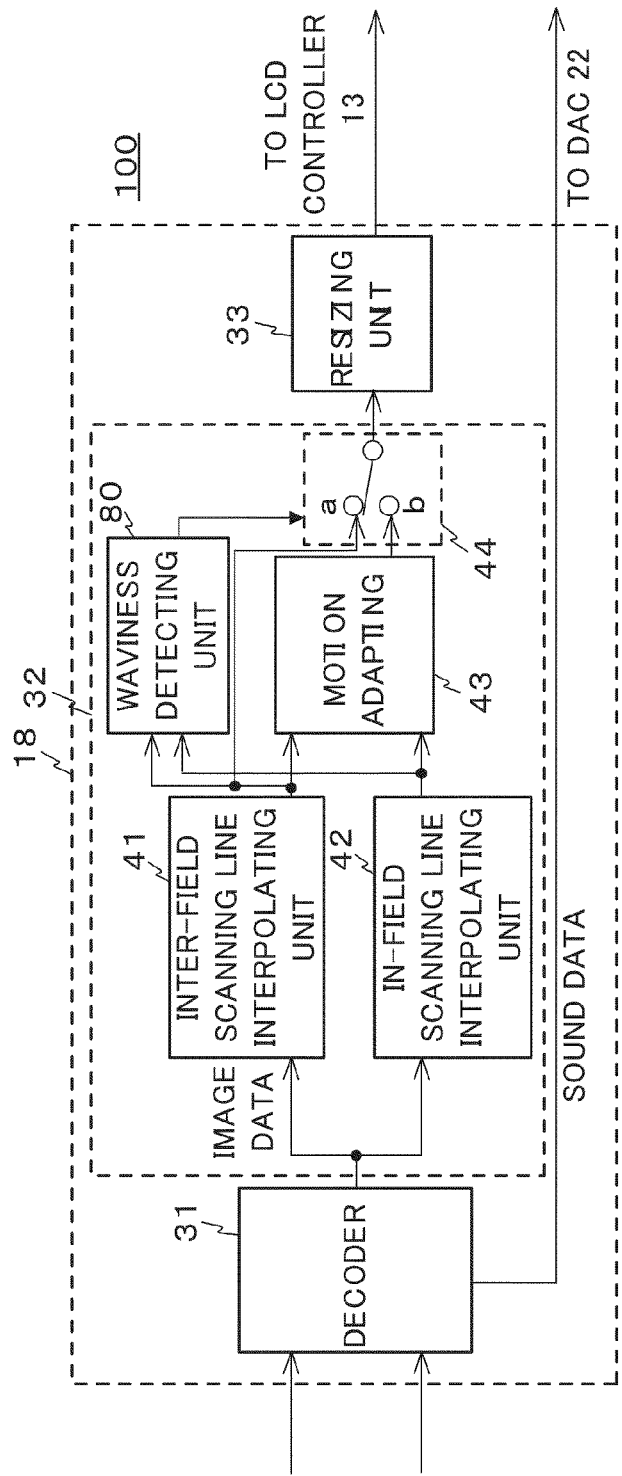
FIG. 12 is a block diagram showing a configuration of a back-end of a mobile terminal according to a fourth embodiment of the present invention.

In the first embodiment, the selector 44 is switched based on whether the input path of a video stream is from the tuner 17 or from the memory card 21. In contrast, as shown in FIG. 12, the back-end 18 of the present embodiment further includes a waviness detecting unit 80 which detects presence/absence of any waviness of an image. According to the present embodiment, the IP conversion scheme is switched in accordance with presence/absence of any waviness of an image.

The waviness detecting unit 80 receives image data output by the inter-field scanning line interpolating unit 41, and also receives image data output by the in-field scanning line interpolating unit 42. The waviness detecting unit 80 compares both received image data with each other line by line or frame by frame, and acquires a differential image therefrom. The waviness detecting unit 80 acquires a power spectrum relative to a spatial frequency in the differential image.

Figure 13A:
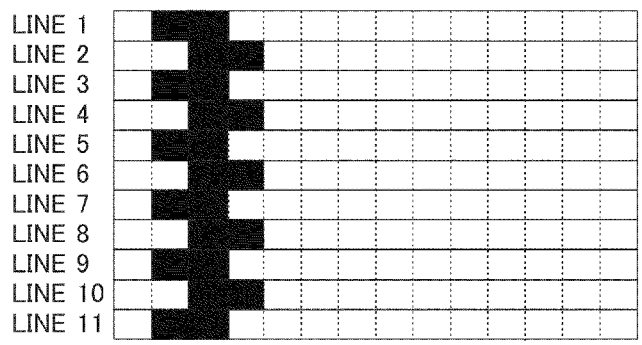
FIG. 13A is a diagram showing example image data output by an inter-field scanning line interpolating unit.
Figure 13B:
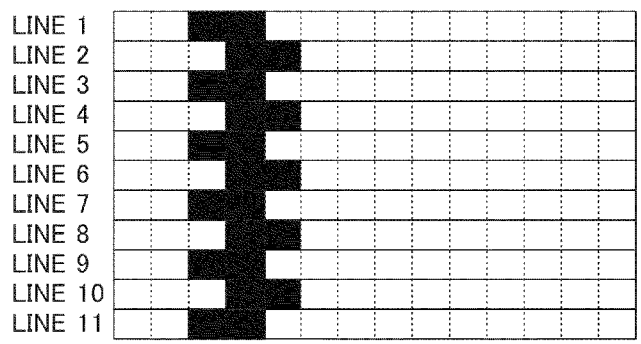
FIG. 13B is a diagram showing example image data output by the inter-field scanning line interpolating unit.
Figure 13C:
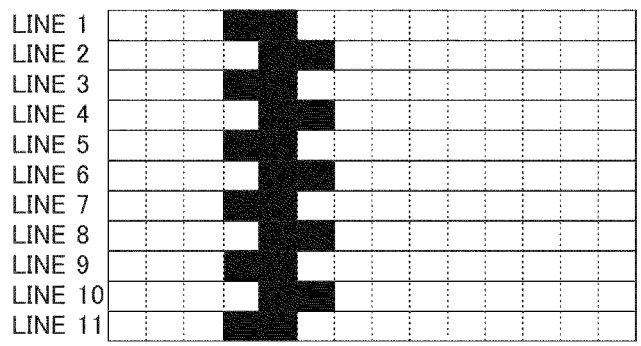
FIG. 13C is a diagram showing example image data output by the inter-field scanning line interpolating unit.
Figure 15A:
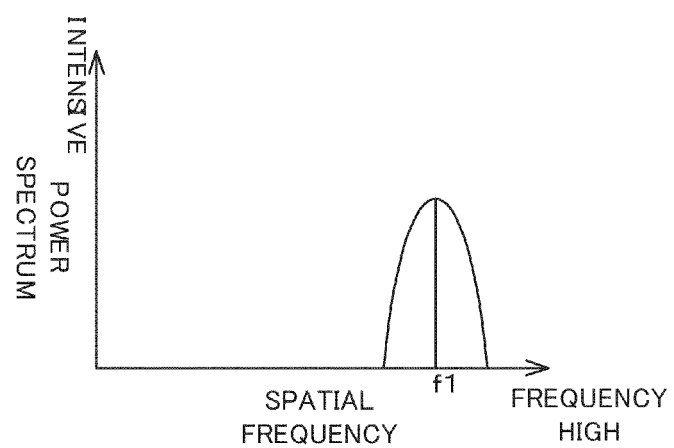
FIG. 15A is a graph showing a power spectrum of differential image data.
Figure 23A:
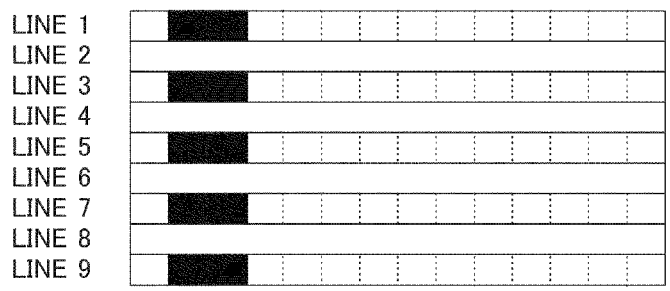
FIG. 23A is an enlarged view of interlacing image data as an original image.
Figure 23B:
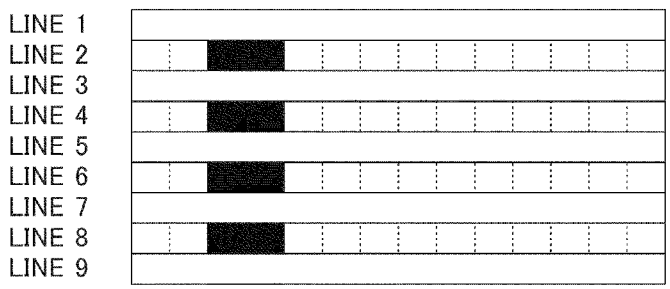
FIG. 23B is an enlarged view of interlacing image data as an original image.
Figure 23C:
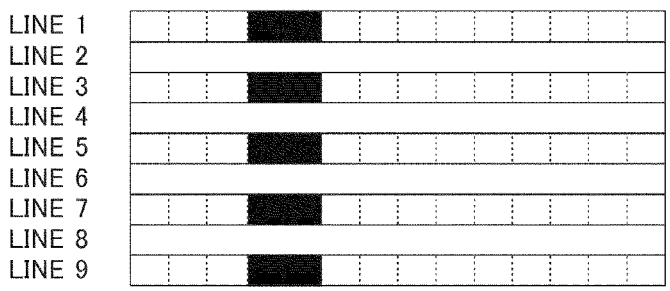
FIG. 23C is an enlarged view of interlacing image data as an original image.

For example, when a video stream which has not been subjected to an enlargement process by a video editing software (see, for example, FIGS. 23A to 23C) is input, image data output by the inter-field scanning line interpolating unit 41 becomes an image including scanning lines of the previous and next fields mixed together for each one line as shown in FIGS. 13A to 13C. In this case, image data output by the in-field scanning line interpolating unit 42 becomes a straight-line image as shown in FIGS. 14A to 14C. Accordingly, a power spectrum of a differential image of both image data with a peak that is a relatively high frequency f1 is acquired as shown in FIG. 15A.

Moreover, when a video stream having undergone an enlargement process by a video editing software (see, for example, FIGS. 24A to 24C) is input, the output by the inter-field scanning line interpolating unit 41 becomes an image containing scanning lines of the previous and next fields mixed together for each three lines (see, for example, FIGS. 4A and 4B). The power spectrum of this image becomes substantially same as the spectrum shown in FIG. 15A.

Figure 15B:
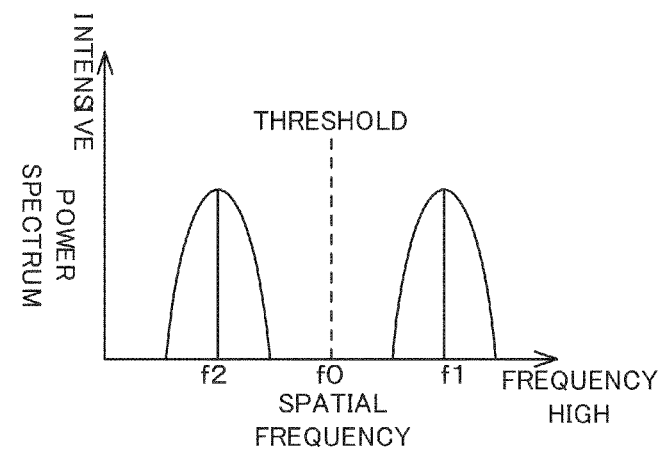
FIG. 15B is a graph showing a power spectrum of differential image data.
Figure 25A:
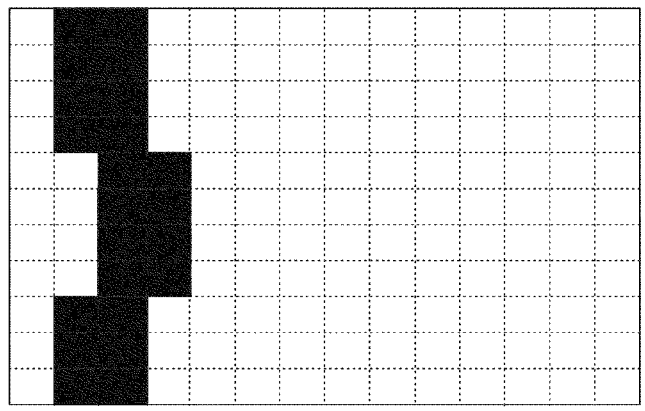
FIG. 25A is an enlarged view of progressive image data edited by a video editing software.
Figure 25B:
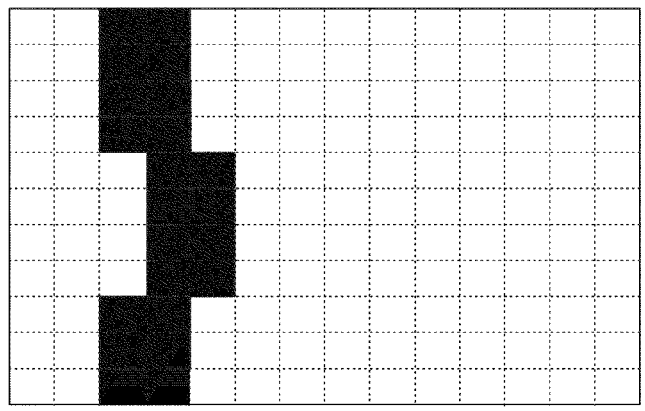
FIG. 25B is an enlarged view of progressive image data edited by the video editing software.
Figure 25C:
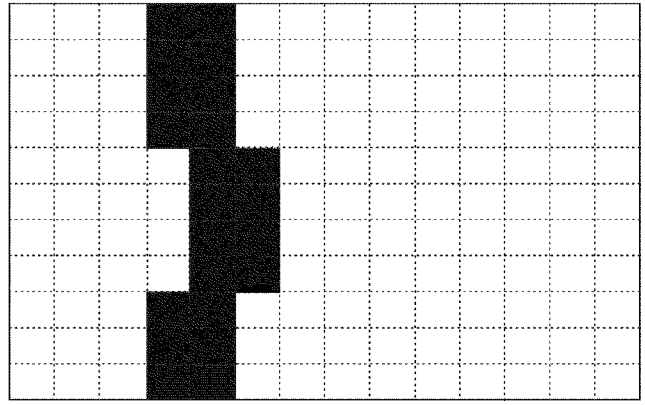
FIG. 25C is an enlarged view of progressive image data edited by the video editing software.
Figure 26:
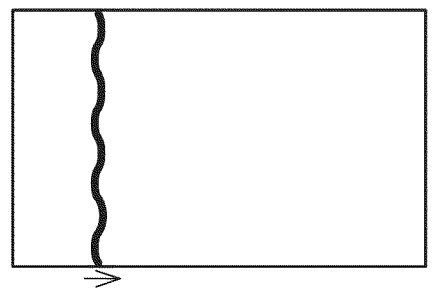
FIG. 26 is an example motion image actually displayed through a conventional technology.

In contrast, the output by the in-field scanning line interpolating unit 42 becomes an image having a large waviness with an eight-line period (see, for example, FIGS. 25A to 25C). Accordingly, as shown in FIG. 15B, in addition to a spectrum having a peak which is the frequency f1 at the high-frequency side, a spectrum having a peak which is a frequency f2 lower than the frequency f1 also appears in this image.

Therefore, according to the present embodiment, a frequency f0 between the frequency f1 and the frequency f2 is set to be a boundary frequency. The waviness detecting unit 80 detects a waviness of an image when a total number S of frequency components, which are equal to or lower than the boundary frequency f0 and which are contained in a spatial frequency component of a differential image between image data input from the inter-field scanning line interpolating unit 41 and image data input from the in-field scanning line interpolating unit 42, is equal to or greater than a predetermined boundary number.

FIG. 16 is a flowchart for an operation (a fourth determination/selection process) of the waviness detecting unit 80. As shown in FIG. 16, first, the waviness detecting unit 80 generates a differential image between image data output by the inter-field scanning line interpolating unit 41 and image data output by the in-field scanning line interpolating unit 42 (step S31). Next, the waviness detecting unit 80 generates a power spectrum of the differential image (step S32). Furthermore, the waviness detecting unit 80 calculates the total number S of power spectra equal to or lower than the boundary frequency f0 through the following formula (step S33).

[Formula 1]

$$S = \sum_{f=0}^{f0} xf \quad (1)$$

where f is a spatial frequency and x is a spectrum at that spatial frequency.

Next, the waviness detecting unit 80 determines whether or not the total number S is equal to or greater than the boundary number (step S34). When the total number S is equal to or greater than the boundary number (step S34: YES), the waviness detecting unit 80 determines that an image contains a waviness, and controls the selector 44 so as to select image data output by the inter-field scanning line interpolating unit 41 (step S35). When the total number S is smaller than the boundary number (step S34: NO), the waviness detecting unit 80 determines that an image contains no waviness, and controls the selector 44 so as to select image data output by the motion adapting unit 43 (step S36).

After the steps S35, S36, the waviness detecting unit 80 terminates the process. The waviness detecting unit 80 executes the above-explained process for each frame.

Note that the boundary frequency and the boundary number must be set to optimized values at the time of production of the mobile terminal in accordance with the number of pixels of an input video signal. Those values may be set by a user after the product (mobile terminal) is shipped.

As explained above, according to the present embodiment, even if a video stream having any waviness of an image generated by an enlargement process by a video editing software is input, such waviness is detected, and the most appropriate scanning line interpolation scheme is selected. Accordingly, any generation of waviness of an image is suppressed, thereby always enabling good image display.

Note that the waviness detecting unit 80 detects a waviness of an image based on a difference between an output image by the inter-field scanning line interpolating unit 41 and an output image by the in-field scanning line interpolating unit 42. The present invention is, however, not limited to this configuration. For example, any waviness of an image can be detected through a conventionally-well-known technique like a block-matching technique.

In the foregoing embodiments, the motion adapting unit 43 outputs image data input from the in-field scanning line interpolating unit 42 in the case of a motion image, and outputs image data input from the inter-field scanning line interpolating unit 41 in the case of a still image. The present invention is, however, not limited to this configuration. For example, image data having a pixel value which is a weighted average value among individual pixel values of image data input from the in-field scanning line interpolating unit 42 and individual pixel values of image data input from the inter-field scanning line interpolating unit 41 may be output in accordance with an amount of change in image data.

This makes it possible for the motion adapting unit 43 to output image data corresponding to a motion part of a motion image having undergone in-field scanning line interpolation, and to generate progressive image data having undergone inter-field scanning line interpolation regarding a still image part having no motion.

The configuration of the mobile terminal 100 of the foregoing embodiments is merely an example, and the structural elements of the mobile terminal 100 of the foregoing embodiments can be combined together in any way.

It should be understood that replacement of the memory card 21 with a hard disk drive, a semiconductor memory like a flash memory, or an optical disk device is within the scope and spirit of the present invention.

In the foregoing embodiment, the display device 15 is a liquid crystal display, but may be a self-light-emitting type organic EL display. The present invention can be applied to various kinds of displays if such a display is small.

The present invention can be applied to general terminal devices which can display a video, such as a PHS (Personal Handy-phone system), a PDA (Personal Digital Assistant), a PC, a television, a video recording device, and a video playing device, in addition to a cell phone.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A video display device comprising:
   one or more processors;
   one or a plurality of input paths into which a video stream is input;
   an inter-field scanning line interpolating unit which superimposes scanning line data of previous and next fields of interlacing image data in the video stream input from an input path among the plurality of input paths, at least two of the input paths being configured to be connected to a different type of device to perform inter-field scanning line interpolation, and which generates progressive image data corresponding to the video stream;
   a determining unit which determines whether or not a reliability of the video stream meets a predetermined level based on the type of the device to which the input path is configured to be connected; and
   a selecting unit which selects image data having undergone interpolation by the inter-field scanning line interpolating unit as an image to be displayed when the determining unit determines that the reliability of the video stream does not meet the predetermined level based on the type of the device to which the input path is configured to be connected and when the progressive image data is determined to be a still image, the determining unit determining that the reliability of the video stream does not meet the predetermined level when the input path into which the video stream is input is a particular input path, the particular input path having a fixed configuration to receive the image data from a particular type of device,
   wherein the one or more processors are configured to cause one or more of the interpolating unit, the determining unit and the selecting unit to superimpose the scanning line data, determine whether the reliability meets the predetermined level, and select the image data, respectively.

2. The video display device according to claim 1, further comprising a memory which stores the video stream,
   wherein the particular input path is an input path into which the video stream read from the memory is input.

3. The video display device according to claim 1, further comprising a receiving unit which receives the video stream via a communication network,
   wherein the particular input path is an input path into which the video stream received by the receiving unit is input.

4. The video display device according to claim 1, wherein the determining unit determines whether or not the reliability of the video stream meets the predetermined level based on identification information of the video stream.

5. The video display device according to claim 4, wherein the identification information is in a header of the video stream, the determining unit comprises an extracting unit which extracts the identification information from the header, and
   the determining unit determines whether or not the reliability of the video stream meets the predetermined level based on the identification information extracted by the extracting unit.

6. The video display device according to claim 4, wherein the identification information is in a file name or an extension name of the video stream,
   the determining unit comprises an extracting unit which extracts the identification information from the file name or the extension name, and
   the determining unit determines whether or not the reliability of the video stream meets the predetermined level based on the identification information extracted by the extracting unit.

7. The video display device according to claim 1, further comprising an in-field scanning line interpolating unit which performs interpolation on interlacing image data in the video stream using scanning line data in a same field,
   wherein the determining unit comprises a waviness detecting unit which detects a waviness of an image in the video stream based on first image data generated by the inter-field scanning line interpolating unit and second image data generated by the in-field scanning line interpolating unit, and
   the determining unit determines that the reliability of the video stream does not meet the predetermined level upon detection of a waviness of an image by the waviness detecting unit.

8. The video display device according to claim 7, wherein the waviness detecting unit detects a waviness of an image when a total number of spatial frequency components which are equal to or lower than a predetermined frequency and which are in differential image data between the first image data and the second image data is equal to or greater than a predetermined number.

9. The video display device according to claim 1, further comprising:
   an in-field scanning line interpolating unit which performs interpolation on interlacing image data in the video stream using scanning line data in a same field; and
   a motion adapting unit into which image data output by the inter-field scanning line interpolating unit and image data output by the in-field scanning line interpolating unit are input, which applies image data output by the in-field scanning line interpolating unit to a part having a motion in the image data, and which outputs image data, to which the image data output by the inter-field scanning line interpolating unit is applied, to a part having no motion in the image data,
   wherein the selecting unit selects image data output by the motion adapting unit as an image to be displayed when the determining unit determines that the reliability of the video stream meets the predetermined level.

10. A video display device comprising:
   one or more processors;
   one or a plurality of means for receiving an input video stream as one or more input paths;
   a means for performing inter-field scanning line interpolation which superimposes scanning line data of previous and next fields of interlacing image data in the video stream input from an input path among the plurality of input paths, at least two of the input paths being configured to be connected to a different type of device to perform inter-field scanning line interpolation, and which generates progressive image data corresponding to the video stream;
   a means for determining whether or not a reliability of the video stream meets a predetermined level based on the type of the device to which the input path is configured to be connected; and
   a means for selecting image data having undergone interpolation by the inter-field scanning line interpolating means as an image to be displayed when the determining means determines that the reliability of the video stream does not meet the predetermined level based on the type of the device to which the input path is configured to be connected and when the progressive image data is determined to be a still image, the determining means determining that the reliability of the video stream does not meet the predetermined level when the input path into which the video stream is input is a particular input path, the particular input path having a fixed configuration to receive the image data from a particular type of device,
   wherein the one or more processors are configured to cause one or more of the interpolating means, the determining means and the selecting means to superimpose the scanning line data, to determine whether the reliability meets the predetermined level, and select the image data, respectively.

11. A display control method for a video display device, the video display device including one or a plurality of input paths into which a video stream is input, and an inter-field scanning line interpolating unit which superimposes scanning line data of previous and next fields of interlacing image data in the video stream input from an input path among the plurality of input paths, at least two of the input paths being configured to be connected to a different type of device to perform inter-field scanning line interpolation, and which generates progressive image data corresponding to the video stream, the display control method comprising:
   determining, by one or more processors, whether or not a reliability of the video stream meets a predetermined level based on the type of the device to which the input path is configured to be connected; and
   selecting, by the one or more processors, image data having undergone interpolation by the inter-field scanning line interpolating unit as an image to be displayed when it is determined in the determining step that the reliability of the video stream does not meet the predetermined level based on the type of the device to which the input path is configured to be connected and when the progressive image data is determined to be a still image, the reliability of the video stream being determined to not meet the predetermined level when the input path into which the video stream is input is a particular input path, the particular input path having a fixed configuration to receive the image data from a particular type of device.

12. A non-transitory storage medium storing a program to cause a computer that controls a video display device to execute a method, the video display device including one or a plurality of input paths into which a video stream is input, and an inter-field scanning line interpolating unit which superimposes scanning line data of previous and next fields of interlacing image data in the video stream input from an input path among the plurality of input paths, at least two of the input paths being configured to be connected to a different type of device to perform inter-field scanning line interpolation, and which generates progressive image data corresponding to the video stream, the method comprising:

determining, by the computer, whether or not a reliability of the video stream meets a predetermined level based on the type of the device to which the input path is configured to be connected; and selecting, by the computer, image data having undergone interpolation by the inter-field scanning line interpolating unit as an image to be displayed when the determining unit determines that the reliability of the video stream does not meet the predetermined level based on the type of the device to which the input path is configured to be connected and when the progressive image data is determined to be a still image, the reliability of the video stream being determined to not meet the predetermined level when the input path into which the video stream is input is a particular input path, the particular input path having a fixed configuration to receive the image data from a particular type of device.

13. The video display device according to claim 1, wherein the determining unit determines that the reliability of the video stream does not meet the predetermined level when the type of the device to which the input path is configured to be connected is a memory card.

14. The video display device according to claim 1, wherein the determining unit determines that the reliability of the video stream does meet the predetermined level when the type of the device to which the input path is configured to be connected is a tuner.

* * * * *